(12) United States Patent
Humfeldt et al.

(10) Patent No.: US 12,534,202 B2
(45) Date of Patent: Jan. 27, 2026

(54) COVER FOR A TRANSITION FROM A LINING TO A MONUMENT

(71) Applicant: Airbus Operations GmbH, Hamburg (DE)

(72) Inventors: Dirk Humfeldt, Hamburg (DE); Benedikt Kircher, Hamburg (DE); Thomas Hoffmeister, Hamburg (DE); Dirk Fritsche, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/661,207

(22) Filed: May 10, 2024

(65) Prior Publication Data

US 2024/0375772 A1 Nov. 14, 2024

(30) Foreign Application Priority Data

May 12, 2023 (EP) .................................... 23173021

(51) Int. Cl.
*B64D 11/00* (2006.01)
*B64C 1/06* (2006.01)

(52) U.S. Cl.
CPC .............. *B64D 11/00* (2013.01); *B64C 1/066* (2013.01)

(58) Field of Classification Search
CPC . B64D 11/00; B64D 2011/0046; B64D 11/04; B64C 1/066; B64C 1/00
See application file for complete search history.

(56) References Cited

U.S. PATENT DOCUMENTS

| | | | |
|---|---|---|---|
| 2015/0013265 A1* | 1/2015 | Castanha | B60R 13/02 52/716.6 |
| 2015/0329192 A1 | 11/2015 | Taguchi | |
| 2019/0127069 A1 | 5/2019 | Koschinski et al. | |
| 2021/0237844 A1* | 8/2021 | Malek | B64D 11/0023 |

FOREIGN PATENT DOCUMENTS

| | | |
|---|---|---|
| CN | 201633920 U | 11/2010 |
| DE | 102004049893 B4 | 7/2010 |
| EP | 3134313 B1 | 4/2022 |

OTHER PUBLICATIONS

European Search Report for corresponding European Patent Application No. 23173021.9 dated Nov. 6, 2023.
European Examination Report from corresponding European application No. 23173021.9 dated Aug. 22, 2025.

* cited by examiner

*Primary Examiner* — Valentina Xavier
(74) *Attorney, Agent, or Firm* — Greer, Burns & Crain, Ltd.

(57) ABSTRACT

An interior aircraft section having a cover for a gap between a lining and a monument. The cover comprises a basic body, at least one mounting end configured to be fixedly mounted to the monument, and a connector configured to fixedly mount the basic body to the lining. The connector is arranged in an area of the basic body overlapping the lining. Also, an aircraft having such interior aircraft section.

13 Claims, 3 Drawing Sheets

COVER FOR A TRANSITION FROM A LINING TO A MONUMENT

CROSS-REFERENCES TO RELATED APPLICATIONS

This application claims the benefit of European Patent Application Number 23 173 021.9 filed on May 12, 2023, the entire disclosure of which is incorporated herein by way of reference.

FIELD OF THE INVENTION

The present disclosure generally relates to a cover for a gap between a lining and a monument, and particularly to an interior aircraft section and an aircraft having such cover. The cover bridges and covers a gap between a lining and a monument. The cover is fixedly mounted to the monument and has a connector to fixedly mount the cover to the lining.

BACKGROUND OF THE INVENTION

Aircraft usually include one or more monuments, such as a lavatory, a galley, a bulkhead, a partition wall, and the like, which are arranged along a longitudinal direction of the aircraft in correspondence with the seat rows of the aircraft. The layout of seat rows and monuments is adjusted usually by the aircraft operator and can vary from aircraft to aircraft. The position can be adjusted in the longitudinal direction usually in a grid of 1 inch (e.g., according to seat rails having a mounting grid pattern of 1 inch distance between adjacent positions).

On the other hand, aircraft usually comprise a plurality of frames (a primary structure arranged in a cross-sectional plane of the aircraft), an interior side of which is covered by a sidewall. The sidewall has a three-dimensional shape that has its innermost part at a frame, while the sidewall in an area between two adjacent frames (in longitudinal direction of the aircraft) has its outermost part. This allows to maximize the interior space of the passenger cabin, for example, for a passenger sitting in a seat next to the sidewall.

However, the monuments could be based on an arbitrary length to enable, for example, carry-over from similar developments, or to maximize stowage capacity. Thus, when placing a monument in the passenger cabin, an edge or side of the monument may be located at an arbitrary position relative to the sidewall.

This usually requires the monument to be customized, which is time-consuming and also expensive. In addition, the sidewall may be required to be fixated on one side to the monument. For some positions of the monument near the frame, this fixation could interfere with sealants between sidewall and monument.

SUMMARY OF THE INVENTION

It is therefore an object of the present disclosure to improve the interior components of the vehicle.

This object may be solved by the present invention as disclosed in one or more embodiments described herein. Preferred embodiments are also described herein.

According to a first aspect to better understand the present disclosure, a cover for a gap between a lining and a monument comprises a basic body, at least one mounting end configured to be fixedly mounted to the monument, and a connector configured to fixedly mount the basic body to the lining. The connector is arranged in an area of the basic body overlapping the lining.

Since the cover is mounted to the monument no additional fixation, such as a bracket, is required. Furthermore, the basic body of the cover is large enough to cover or span over the gap between the lining and the monument. Since the basic body overlaps the lining, in order to have the connector arranged in this part of the basic body, it is ensured that the gap is entirely closed by the cover. Fixedly mounting the basic body to the lining, while the basic body is fixedly mounted to the monument, further provides for a stable structure covering the gap irrespective of any relative movement between the monument and the lining.

In addition, fixedly mounting the basic body of the cover to the monument and the lining provides for securely holding the lining, even if the lining is cut, for example, in order to give way for the monument. Thus, the cover can function as a static substitute for any other holding structure of the lining with respect to the primary structure of the aircraft.

A lining can be any interior component of a vehicle, such as an aircraft, a train, a bus, a ship, or other passenger carrier. Such interior component can be a sidewall as described above, a ceiling panel, a Covelight, a dado panel, etc. A monument can be a lavatory, a galley, a bulkhead, a partition wall, and the like. An angle between the portion of the monument, where the cover is fixedly mounted, and the lining can have any value. Thus, while the majority of cases will have a substantially perpendicular arrangement of lining and monument (portion), the present disclosure also relates to cases where the lining and monument are substantially flush (approximately 180°) or even beyond 180°.

The basic body of the cover can be customized for the situation, i.e., the location of the monument relative to the lining. It is much faster and more cost-effective to only customize the cover compared to customizing the monument. Particularly, if the monument is reused in different cabin layouts, only the cheaper cover has eventually to be replaced, while the expensive monument can be reused unaltered.

In addition, customizing the cover further increases flexibility of the layout, size and position of the monument. Specifically, the position of the monument may not be limited to a floor grid for monuments, i.e., predefined positions for monuments, but allows to place the monument relative to the lining as well as relative to a frame on a much finer grid. As a mere example, cover provides for a mm-based flexibility of the size and/or position of the monument.

In an implementation variant, the at least one mounting end can comprise a plurality of mounting ends spaced apart from one another along a longitudinal direction of the basic body. In other words, the plurality of mounting ends is arranged one after the other. The longitudinal direction of the basic body is, for example, along a substantially vertical direction along the sidewall and/or along the monument.

Alternatively or additionally, the at least one mounting end can comprise a plurality of mounting ends spaced apart from one another along a cross-sectional direction of the basic body. In other words, the cross-section of the basic body has a certain extent, which comprises at least two mounting ends, for example, viewing in a substantially horizontal direction between.

For instance, if combined with a plurality of mounting ends in a longitudinal direction, the cover can comprise a two-dimensional grid of mounting ends.

In any case, it is to be understood that the monument will be equipped with a corresponding number of mounting positions and/or one or more mounting rails along which the mounting ends of the cover can be inserted or placed thereon and can be mounted.

In a further implementation variant, the at least one mounting end can extend along the longitudinal direction of the basic body. Thus, the mounting end is not point-shaped, but elongates along the longitudinal direction of the basic body. The monument will then be equipped with a corresponding groove, recess or rail to receive the elongated mounting end, and the mounting end can be fixated.

In another implementation variant, the cover can further comprise a seal configured to flexibly close a space between the basic body and the lining. The space between the basic body and the lining can be arbitrarily small. In order to avoid visibility of the area behind the cover and/or to avoid items to fall behind the cover, the flexible seal can be arranged to close the gap between the basic body of the cover and the lining.

The seal can be added to the basic body or can be integrated into the basic body.

Furthermore, as a mere example, the connector may be fixedly mounted to the lining with a tool reaching the connector through a slit or gap between the lining and the basic body. This slit or gap can be closed by the seal, in order to hide the connector and its accessibility.

In yet another implementation variant, the cover can further comprise at least one light source arranged in a space between the basic body and the lining and/or the monument. Thus, a visual effect can be achieved between the lining and the monument. In addition, the at least one light source can optimize illumination of a corner between lining and monument, which is often not optimally lit.

In a further implementation variant, the cover can further comprise a monument connector configured to fixedly mount the basic body to the monument. Such monument connector may be provided in addition to or may replace one or more of the at least one mounting end. In addition, the monument connector may be employed, if the monument has existing mounting locations. Moreover, a monument connector may also be employed, if a light source is provided in a slit or gap between the basic body and the monument, while the monument connector is arranged further away from an entrance to the slit or gap.

According to a second aspect to better understand the present disclosure, an interior aircraft section comprises a lining, a monument comprising at least one section arranged adjacent to the lining and forming a gap between the monument and the lining, and a cover according to the first aspect or one of its variants or examples.

The cover is fixedly mounted to the monument and the connector of the cover is fixedly mounted to the lining. This achieves a force-transmitting connection between lining and monument. Thus, any relative movement of lining and monument may be hindered by the cover and/or may be compensated by the cover.

In an implementation variant, the interior aircraft section can further comprise at least one insert or onsert disposed in or on the monument and configured to receive one of the at least one mounting end of the cover. The at least one insert or onsert may be provided after installing the monument, but before installing the cover. Thus, the at least one insert or onsert may be placed at locations customized for the current situation. The insert or onsert can be a conventional fastening or mounting device.

In another implementation variant, the lining can have a side edge cut adjacent to the monument. Thus, cutting the lining allows positioning the monument independent of the lining. A lining is usually mounted to the primary structure of the vehicle, such as a frame. Cutting the lining, hence, means that the lining is not fixed at this side anymore. However, the connector of the cover fixedly mounts the lining to the basic body and the basic body is fixedly mounted to the monument, so that the lining is indirectly fixed to the monument.

In addition, cutting the lining allows placing the monument closer to the primary structure of the vehicle, particularly placing the monument in an area, previously occupied by the lining. Thus, the interior space of the vehicle can be optimally used by either increasing the size of the monument or increasing the cabin space.

In yet another implementation variant, the cover is manufactured to have a shape optimized for the location between the monument and the lining. As a mere example, a 3D printing technique, such as additive layer manufacturing, may be employed to produce the cover in accordance with the corner and gap between lining and monument.

Alternatively or additionally, the cover (at least a part thereof) may be produced by extruding a plastic material, such as a thermoplastic material. Specifically, extrusion (or co-extrusion of multiple materials) allows customized covers with respect to size, exterior form, cross-sectional shape, etc., in addition, extrusion further allows to manufacture semi-finished covers in advance, that are customized shortly before installation. As a mere example, the extruded cover may be made of a thermoplastic material, so that its three-dimensional shape can be adapted to the installation situation by thermal forming of the semi-finished cover. These examples are not to be understood as limiting the way of manufacturing the cover.

For instance, the edge or gap between lining and monument may have any longitudinal shape and form, which comprises that the edge or gap can include one or more curved parts. In other words, the longitudinal direction of the cover or basic body is not limited to a straight line, but means any path between beginning and end of the cover.

For example, the lining may have a three-dimensional shape, along which the cover is to be arranged. Moreover, a side of the basic body, where the mounting end is arranged, may have a different longitudinal shape than the side of the basic body, where the connector is arranged. For instance, the side of the basic body, where the connector is arranged, may follow the three-dimensional shape of the lining. The side of the basic body, where the mounting end is arranged, however, may be independent from this three-dimensional shape. In other words, the basic body may have different widths and/or thicknesses in a cross-sectional direction, in order to compensate for the different shapes.

Thus, a highly customized cover can be provided at the time of installing the monument and/or the lining.

Even if the monument is relocated to a different position in the vehicle, a new cover can be made for the new situation to an adjacent lining.

According to a third aspect to better understand the present disclosure, an aircraft comprises at least one interior aircraft section of the second aspect or one of its variants or examples.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
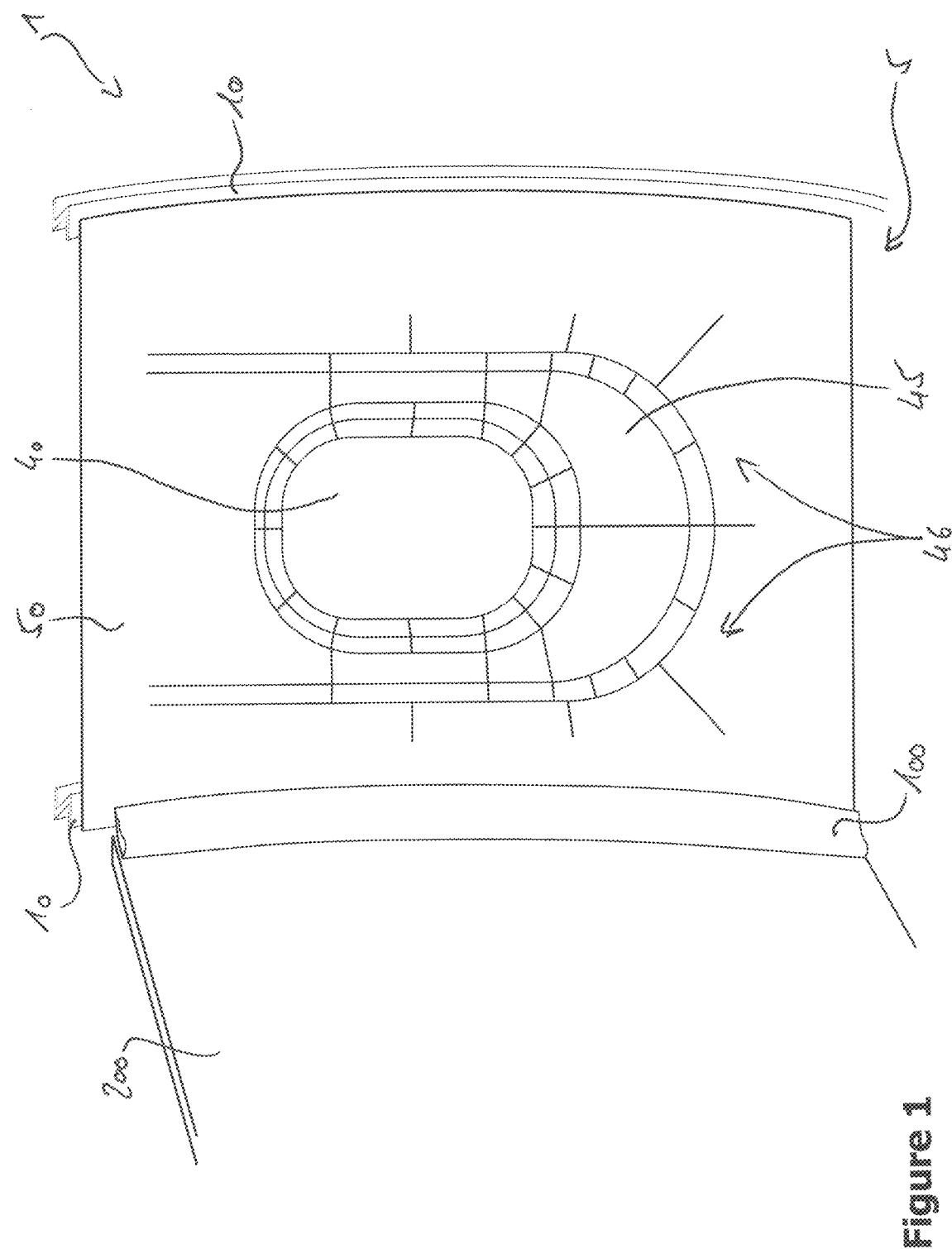
FIG. 1 schematically illustrates an interior aircraft section.

FIG. 1 schematically illustrates an exemplary interior aircraft section 5 including a lining 50 (e.g., a sidewall 50) and a monument 200. It is to be understood that only a wall is illustrated, which can be the entire monument 200 (in case of a partition wall or bulkhead) or can form part of the monument 200 (in case of a rather three-dimensional lavatory, galley, closet, etc.).

The aircraft section 5 is arranged close to a primary structure of an aircraft 1, such as frames 10 arranged in a cross-sectional plane of the aircraft 1.

The sidewall 50 has an opening for a window 40 and is arranged in a space between two adjacent frames 10. For example, the sidewall 50 can be mounted to the frames 10, in order to cover this area of the primary structure and to provide a visible surface 50a (see FIG. 2) of the passenger cabin 5, and thus facing an interior of the space of the interior aircraft section 5. An opposite surface 50b (see FIG. 2) faces the frames 10 and thus a primary aircraft structure. Since the frames 10 are larger in the cross-sectional direction of the aircraft than the window 40, the sidewall 50 can be shaped to move outwards from the frames 10 towards the window 40. As a mere example, a window casing 45 and/or three-dimensionally shaped regions 46 may provide the sidewall 50 with a shape deviating from a cylinder section (defined by the inner surfaces of the frames 10).

The monument 200 can be placed anywhere along a longitudinal direction of the vehicle 1 (left right direction in FIG. 1). Thus, the monument 200 will be placed anywhere in front of the lining 50. The gap present between the monument 200 and the lining 50 will be covered by a cover 100 that will be explained in more detail with respect to FIGS. 2 and 3.

Figure 2:
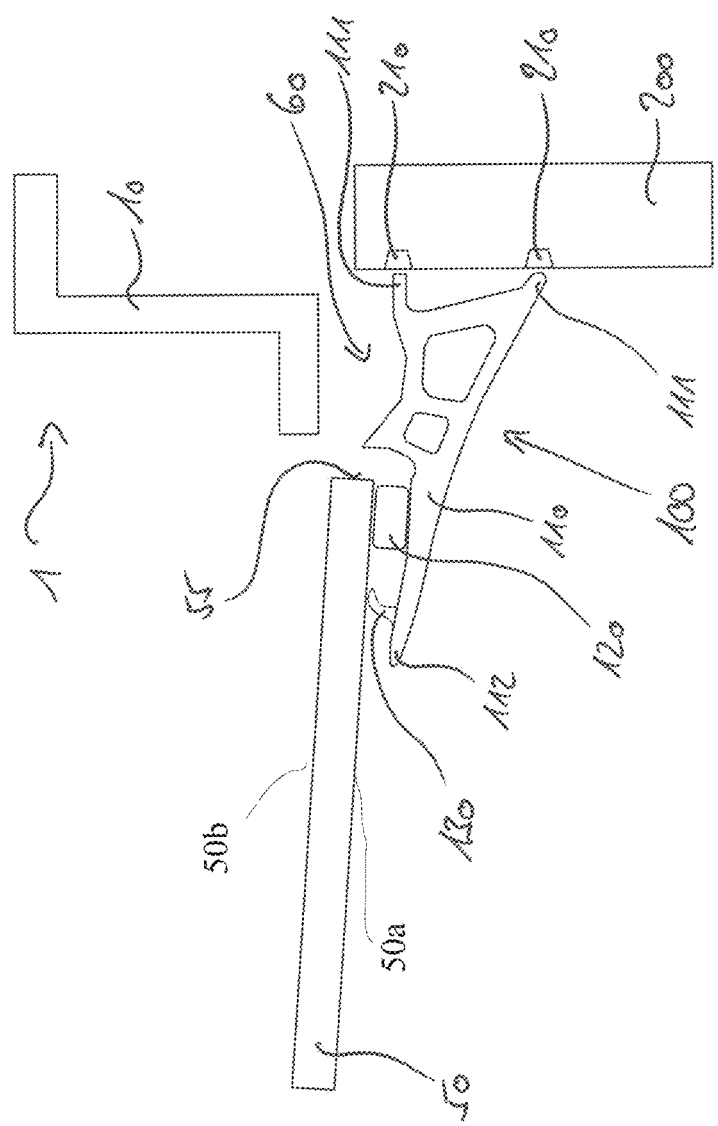
FIG. 2 schematically illustrates an exemplary cover for a lining and a monument.

FIG. 2 schematically illustrates a cross-section of a cover 100 for a gap 60 between a lining 50 and monument 200, such as the situation in FIG. 1.

The cover 100 has a basic body 110 and at least one mounting end 111 configured to be fixedly mounted to the monument 200. For instance, fastening locations 210, such as the illustrated inserts 210 or onserts or the like, can be provided in or on the monument 200. Each fastening location 210 can be configured to receive a mounting end 111 or allow a mounting end 111 to be fixedly mounted to the fastening location 210. Thus, a rigid and stable connection between basic body 110 and monument 200 can be achieved.

A further rigid and stable connection is achieved between the basic body 110 and the lining 50 by a connector 120. The connector 120 is arranged in an area of the basic body 110 overlapping the lining 50. Thus, the connector 120 is hidden behind the cover 100. It is to be understood that the connector 120 can be configured to allow a relative movement between the lining 50 and the cover 100 in at least on degree of freedom. As a mere example, a horizontal movement of the lining 50 relative to the cover 100 (in left-right direction of FIG. 2) may be possible to a certain extent, for example, to compensate for a deflection of the fuselage of the vehicle or other dynamic movements.

FIG. 2 illustrates the basic body 110 as having two mounting ends 111 in a cross-sectional direction of the basic body 110. This increases stiffness of the connection between the cover 100 and the monument 200. It is to be understood that along the longitudinal direction of the cover 100 (perpendicular to the drawing plane of FIG. 2) a plurality of mounting ends 111 may be provided, which are either spaced apart from one another or extent along the longitudinal direction of the basic body.

Although FIGS. 1 and 2 illustrates the monument 200 as being perpendicularly arranged with respect to the lining 50, it is to be understood that any angle between the monument 200 and the lining 50 can be covered by cover 100. In such cases, the side of the cover 100 having the at least one mounting end 111 may be formed differently, so that the at least one mounting end 111 can be fixedly connected to the monument 200. Thus, the monument 200 and the lining 50 can be arranged parallel to one another, or the cover 100 can even form an outer corner covering the gap 60 between the monument 200 and the lining 50 when the latter two are arranged at an angle greater than 180°.

The lining 50 can have a side edge 55 cut adjacent to the monument 200. As is derivable from FIG. 2, the lining 50 is usually connected to the frame 10, which would, however, block the space for the monument 200. In other words, the lining 50 cannot be placed between the monument 200 and the frame 10. By cutting the lining 50 along the side edge 55, the connection of the lining 50 to the frame 10 ceases. In order to compensate this loss, the lining 50 is rigidly and fixedly connected to the cover 100 via one or more connectors 120. Thus, the lining 50 is fixedly mounted in the interior aircraft section 5, while the monument 200 is given additional space.

Since a gap or slit between the basic body 110 and the lining 50 may still be present, for example, at a front end 112 of the basic body 110, a seal 130 may be arranged to flexibly close the space between the basic body 110 and the lining 50.

Furthermore, the monument 200 is illustrated as having a continuous surface, where the fastening locations 210 are provided. It is to be understood that the monument 200 may form a niche or recess (not illustrated), where the fastening locations 210 are provided. Such niche or recess extends along the corner of the monument 200, i.e., along the longitudinal direction of the cover 100. The cover 100 would at least partly be arranged in this niche or recess, and/or even a portion of the lining 50 could be arranged in this niche or recess.

Figure 3:
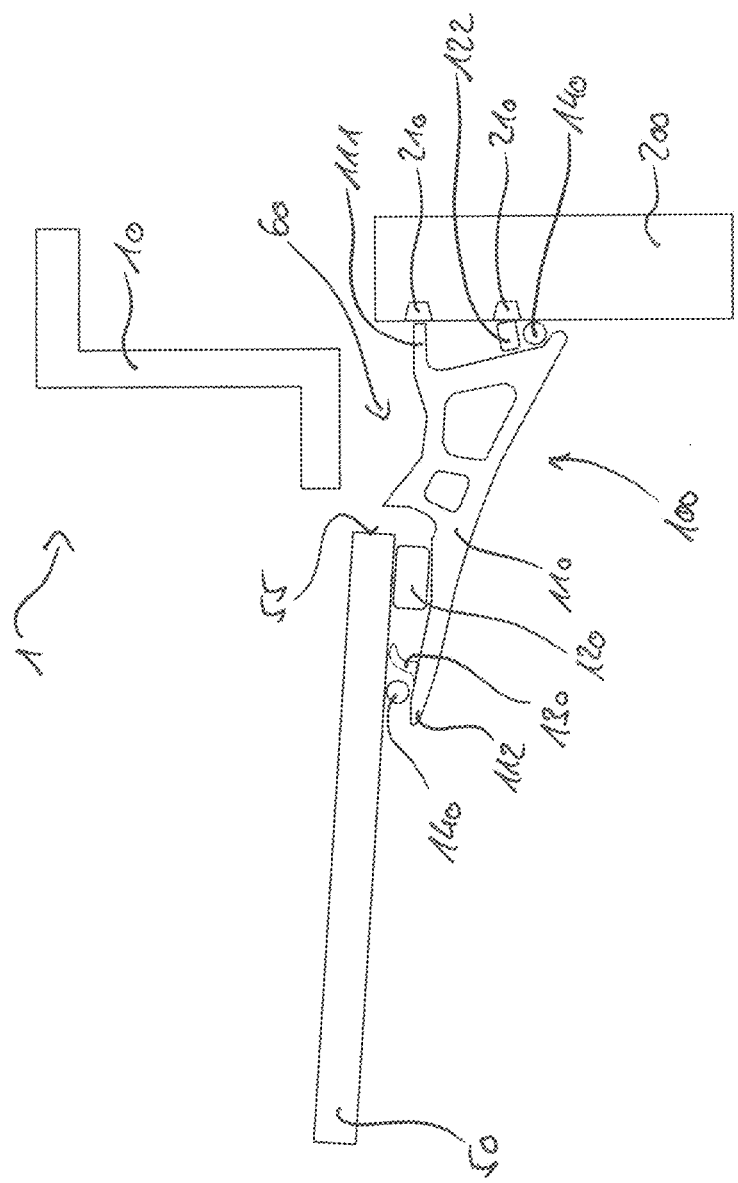
FIG. 3 schematically illustrates another exemplary cover.

FIG. 3 schematically illustrates a cross-section of another exemplary cover 100. The same components and functional parts as in FIG. 2 are given the same reference numerals. For sake of brevity, the description of such components and parts is not repeated.

The cover 100 of FIG. 3 can comprise at least one light source 140 arranged in a space between the basic body 110 and the lining 50 and/or the monument 200. Such light source 140 allows illuminating the corner area of the interior aircraft section 5 at monument 200 and lining 50.

Electricity required for the at least one light source 140 can be provided from the monument 200. As a mere example, the insert 210 can be equipped with an electric connector or electric terminal, that can be used to supply the at least one light source 140 with electric power.

Furthermore, in order to freely position the at least one light source 140, or in case of already existing fastening locations 210 at the monument 200, a monument connector 122 can be provided. The monument connector 122 is configured to fixedly mount the basic body 110 to the monument 200. Thus, the monument connector 122 can be employed in addition to the at least one mounting end 111 and/or can replace the at least one mounting end 111.

It is to be understood that instead of a sidewall 50, any kind of lining, panel, Covelight, etc., can be arranged adjacent to the monument 200, while a gap 60 between both components is covered by the cover 100 as disclosed herein.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interior aircraft section comprising:
a lining having an exterior surface facing a primary aircraft structure and an interior surface facing an interior space of the interior aircraft section;
a monument comprising at least one section arranged adjacent to the lining and forming a gap between the monument and the lining; and
a cover, wherein the cover comprises:
a basic body;
at least one mounting end fixedly mounted to a surface of the monument facing a same space as the interior surface of the lining; and
a connector fixedly mounting the basic body to the interior surface of the lining,
wherein the connector is arranged in an area of the basic body overlapping the lining.

2. The interior aircraft section of claim 1, wherein the at least one mounting end comprises a plurality of mounting ends spaced apart from one another along a longitudinal direction of the basic body, or
wherein the at least one mounting end comprises a plurality of mounting ends spaced apart from one another along a cross-sectional direction of the basic body, or
wherein the at least one mounting end extends along the longitudinal direction of the basic body, or
any combination thereof.

3. The interior aircraft section of claim 1, wherein the cover further comprises:
a seal configured to flexibly close a space between the basic body and the lining.

4. The interior aircraft section of claim 1, wherein the cover further comprises:
at least one light source arranged in a space between the basic body and the lining, or the monument, or both.

5. The interior aircraft section of claim 1, wherein the cover further comprises:
a monument connector configured to fixedly mount the basic body to the monument.

6. The interior aircraft section of claim 1, further comprising:
at least one insert disposed in the monument and configured to receive one of the at least one mounting end of the cover.

7. The interior aircraft section of claim 1, wherein the lining has a side edge cut adjacent to the monument.

8. An aircraft comprising:
the interior aircraft section of claim 1.

9. The interior aircraft section of claim 1, wherein the interior surface of the lining is a visible surface of the lining from a passenger cabin of an aircraft.

10. The interior aircraft section of claim 1, wherein the cover forms an outer corner between the interior surface of the lining and an interior surface of the monument and covering the gap between the monument and the lining.

11. The interior aircraft section of claim 1, wherein the at least one mounting end comprises a plurality of mounting ends spaced apart from one another along a cross-sectional direction of the basic body.

12. The interior aircraft section of claim 11, wherein the at least one mounting end comprises a plurality of mounting ends spaced apart from one another along a longitudinal direction of the basic body.

13. The interior aircraft section of claim 1, wherein the interior space is a passenger cabin of an aircraft.

* * * * *